even Sept. 18, 1962

3,054,719
ACARICIDAL POLY-HALO DIPHENYLSULFIDE

Jan Hendrik Uhlenbroek and Jacques Meltzer, Van Houtenlaan, Weesp, Netherlands, assignors to North American Philips Company, Inc., New York, N.Y., a corporation of Delaware
No Drawing. Filed Apr. 21, 1958, Ser. No. 729,539
Claims priority, application Netherlands Apr. 25, 1957
6 Claims. (Cl. 167—30)

The instant invention relates to novel pesticidal compositions and to methods of destroying mites with these compositions.

It is known, in United States Patent 2,812,281 that 2.4.5 - trichlorodiphenylsulfone, 2.4.5.4' - tetrachlorodiphenylsulfone and 2.4.5.2'.4'.5'-hexachlorodiphenylsulfone are effective miticides for combating the development stages of mites, particularly of the red spider mite.

It is a principal object of this invention to provide new and novel compositions that are even more effective against certain developmental stages of mites, particularly red spider mites.

It is another object of this invention to provide means of destroying mites with the novel compositions of the invention.

These and other objects of this invention will be apparent from the description that follows:

According to the invention it has been found that there are new and novel polychlorodiphenyl-sulfides and sulfoxides corresponding to the general formula:

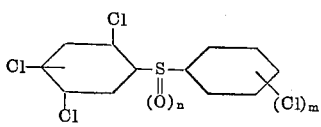

wherein $n$ and $m$ each represent an integer selected from the group consisting of 0 and 1 and the sum of $n+m$ is an integer selected from the group consisting of 0, 1 and 2 are very effective against the developmental stages of mites, particularly the developmental stages of the red spider mite.

It has been found that some compounds of the invention, particularly the compound 2.4.5.4'-tetrachlorodiphenyl-sulfide are even effective against the winter eggs of the red spider mite.

The compounds of the invention may be produced by methods that are known for producing related compounds.

It is possible, for example, to produce 2.4.5-trichloro-4'-nitrodiphenylsulfone by condensation of 2.4.5-trichlorothiopenolate, for example the sodium or potassium salt, with p-chloronitrobenzene and oxidation of the sulphide obtained, for example with hydrogen peroxide. By carrying out the oxidation under mitigated conditions, for example at lower temperatures (about 15 to 25° C.), the corresponding sulphoxides can be produced from the sulphides. The chlorine substituents may be introduced into the second phenyl nucleus for example by reduction of a nitro-group and diazotization of the amino group produced therefrom.

By experiments it has been found that while the eggs and nymphs of mites are killed by the compounds of the invention, to a very larger extent the adult mites are killed to a slightly lesser extent.

In view thereof it may be advantageous, in certain cases, to add to the compounds of the invention, moreover an acaricide having a stronger activity with respect to adult mites, for example O,O - dimethyl - S - (1.2 dicarboxyethyl) dithiophosphate (Malathion) or 2.4.5.4'-tetrachlorodiphenylsulfone (Tedion).

The compounds of the invention may be mixed with Malathion or Tedion in any proportions.

The compounds of the invention may be applied directly in concentrated form. However, because of the extreme effectiveness of these compounds, they are usually applied in highly diluted forms. Thus, these compounds can be applied in the form of aqueous dispersion in which case conventional wetting agents may be used, solutions in suitable hydrocarbon solvents such as toluene or xylene and emulsions of these solutions in water in which case conventional emulsifying agents may be used. The compounds of the invention may also be admixed with solid diluents such as talcum, kaolin, bentonite, fuller's earth or china clay and applied as a dust or admixed with a wetting agent and formulated into a wettable powder and then applied as an aqueous dispersion.

In any event the effectiveness of the formulations may be enhanced by the addition of adhesive agents.

The degree of dilution of the compounds of the invention depends upon the particular environmental conditions applying.

The invention will now be more fully described with reference to the following examples and tables.

The method of preparing the compounds of the invention are illustrated by the following examples.

EXAMPLE I

2.4.5.4'-Tetrachloro-Diphenylsulphide 15 gs. of 2.4.5-trichloro-4'-nitrodiphenylsulphide (0.045 mol) and 45 gs. of iron power (0.8 g. at.) was suspended in 300 mls. of water. After the addition of 0.3 mls. of acetic acid, the mixture was refluxed, while stirring, for 5 hours. Then, after cooling, 1.5 gs. of sodium hydroxide was added and the precipitate was filtered off. The filtrate was extracted with benzene. After drying, filtering and thickening, 12 gs. (88%) of 2.4.5-trichloro-4'-aminediphenylsulphide with a melting point of 125 to 126° C. was obtained.

5 gs. of the 2.4.5-trichloro-4'-aminodiphenylsulphide (0.0164 mol) obtained was dissolved in 60 mls. of acetic acid, which solution was added in drops at a temperature of 5 to 10° C. while stirring, to a solution of 1.25 gs. of sodium nitrite (0.0181 mol) in 12.5 mls. of concentrated sulphuric acid. The reaction mixture had a dark brown color and after the whole was added, the cooling bath was removed. When the temperature had increased to about 15° C., the reaction mixture was poured out into a solution of 3.2 gs. of cuprochloride in 32 mls. of concentrated hydrochloric acid. Nitrogen was gradually liberated. After a few hours the reaction mixture was heated for a short time and diluted with 1 l. of water. After filtering, the yield of crude, nitrogen-free product was 4.82 gs. or 91%; melting point 72 to 86° C. After recrystallisation from ethanol, 2.7 gs. (51%) of 2.4.5.4'-tetrachlorodiphenylsulphide having a melting point of 85 to 86° C. was obtained.

EXAMPLE II

2.4.5.4'-Tetrachloro-Diphenylsulphoxide 2 gs. of 2.4.5.4'-tetrachloro-diphenylsulphide (0.00617 mol) was dissolved in 50 mls. of acetic acid, after which 1.5 gs. of 22% hydrogen peroxide (0.0097 mol) in 10 mls. of acetic acid was added. After ten days at room temperature, the acetic acide was evaporated at a reduced pressure, water was added and the reaction mixture was extracted with diethyl-ether. The ethereal solution was washed with a sodium-bicarbonate solution and water. After the evaportiaon the yield of crude product was 2 gs.; melting point 132 to 136° C. After recrystallisation from ethanol, 1.4 gs. (67%) of 2.4.5.4'-tetrachloro-diphenylsulphoxide having a melting point of 136 to 138° C. was obtained.

EXAMPLE III

2.4.5-Trichloro-Diphenylsulphide 6.4 gs. of 2.4.5-trichloro-4'-aminodiphenylsulphide (0.021 mol) obtained as described in Example I, was dissolved, while heated gently, in 135 mls. of concentrated sulphuric acid and after cooling poured out carefully, while stirring and cooling, into 400 mls. of absolute ethanol after which a further 200 mls. of absolute ethanol was added.

Then at a temperature of 5° C. a solution of 1.6 gs. of sodium nitrite (0.023 mol) in 2 mls. of water was added in drops. Then stirring was continued for a time at 5° C. After the temperature had increased slowly to about 20° C., the reaction mixture was refluxed until no nitrogen was any longer liberated. After being cooled with water the major part of the ethanol was evaporated under a reduced pressure.

Then the mixture obtained was extracted with ether, and the ethereal solution was washed with water, 2 n-caustic soda and again with water. After drying and thickening, 4.1 gs. (67%) of an oily product, which soon solidified, was obtained. Melting point 64 to 74° C. The substance was purified by absorption with aluminia. In order to do this the substance was dissolved in a small quantity of benzene and the solution was introduced into a column filled with alumina, after which the substance was eluated with petroleum ether (boiling range 40 to 60° C.). After thickening of the solution, 3.1 gs. (51%) of 2.4.5-trichloro-diphenylsulphide having a melting point of 82° C. was obtained.

EXAMPLE IV

2.4.5-Trichloro-Diphenylsulphoxide 1.5 gs. of 2.4.5-trichloro-diphenylsulphide (0.0052 mol) obtained as described in Example III was dissolved in 30 mls. of acetic acid, after which 1.05 gs. of 25% hydrogen peroxide (0.0077 mol) dissolved in 7.5 mls. of acetic acid, was added. After 9 days at room temperature, the major part of the acetic acid was evaporated under a reduced pressure, after which the residue was dissolved in ether. The ethereal solution was washed, in order to remove residual acetic acid, if any, with an aqueous sodium bicarbonate solution and then with water. By drying, thickening and recrystallisation from ethanol, 1.2 gs. (76%) of 2.4.5-trichloro-diphenylsulphoxide, having a melting point of 105 to 106° C. was obtained.

In order to examine accurately the killing effect on eggs and larvae of the red spider mite, two series of two-leaved bean plants were used:

(a) One series was infested with female red spider to obtain eggs on the leaves. After two days the female red spiders were removed and the leaves with the eggs immersed into the suspension or emulsion to be tested. The check took place after eight days.

(b) A further series of plants was immersed into a suspension or emulsion, dried and after thus treated was infected with female red spider. After two days the red spider was removed. Eight days afterwards the kill of eggs, larvae and nymphs was checked. The oldest eggs had a lifetime of 10 and the youngest a lifetime of 8 days.

The kill of eggs and larvae on the untreated plants is low, usually below 3%, rarely more than 5% and never more than 10%. With the kill percentages indicated in the following table, the checked kill is calculated in accordance with Abbott's formula $$\frac{a-b}{a} \times 100\%$$

wherein $a$ designates the survivors on the check plant and $b$ the survivors of the treated leaves.

The results of the experiments carried out with the aforesaid substances are recapitulated in the following table. In the first column are indicated the compounds, in the second the tested concentrations. The kill percentages of series (a) are indicated in the columns 3 to 5 under the heading "Immersed eggs"; the kill percentage of series (b) is indicated in the columns 6 to 8 under the heading "Eggs on residue."

| 1 | 2 | 3 | 4 | 5 | 6 | 7 | 8 |
|---|---|---|---|---|---|---|---|
| Compound | Concentration (mg./l.) | Immersed eggs | | | Eggs on residue | | |
| | | E | L | T | E | L | T |
| 2.4.5-trichloro-diphenylsulfoxide | 1,000 | 90 | 100 | 100 | 100 | ------ | 100 |
| | 300 | 82 | 100 | 100 | 100 | ------ | 100 |
| | 100 | 54 | 97 | 99 | 100 | ------ | 100 |
| | 30 | 42 | 99 | 99 | 98 | 66 | 99 |
| | 10 | 11 | 36 | 43 | 82 | 30 | 90 |
| 2.4.5.4'-tetrachloro-diphenylsulfoxide | 300 | 100 | ------ | 100 | 100 | ------ | 100 |
| | 100 | 94 | 100 | 100 | 97 | 100 | 100 |
| | 30 | 90 | 100 | 100 | 93 | 100 | 100 |
| | 10 | 60 | 100 | 100 | 86 | 100 | 100 |
| 2.4.5.-trichloro-diphenylsulfide | 1,000 | 99 | 100 | 100 | 99 | 100 | 100 |
| | 300 | 99 | 100 | 100 | 100 | ------ | 100 |
| | 100 | 81 | 99 | 100 | 99 | 4 | 99 |
| | 30 | 25 | 56 | 66 | 70 | 6 | 72 |
| | 10 | 16 | 22 | 35 | 41 | 7 | 46 |
| 2.4.5.4'-tetrachloro-diphenylsulfide | 300 | 92 | 100 | 100 | 100 | ------ | 100 |
| | 100 | 69 | 100 | 100 | 99 | 100 | 100 |
| | 30 | 60 | 99 | 100 | 88 | 95 | 98 |
| | 10 | 52 | 98 | 98 | 83 | 99 | 99 |
| | 3 | 23 | 87 | 88 | 71 | 95 | 96 |
| | 1 | 15 | 58 | 60 | 32 | 56 | ------ |

NOTE.—Kill of eggs, larvae and nymphs of bean red spider, *Tetranychus urticae* Koch on bean plants, treated with polychloro-di-phenylsulphoxides and polychloro-diphenylsulphides. E=percentage of killed eggs. L=percentage of killed larvae and nymphs. T=percentage of total kill.

From this table it is evident that particularly those compounds according to the invention have a high acaricidal activity in which $m=1$ and $n=0$ or 1. Thus 2.4.5.4'-tetrachlorodiphneylsulfoxide and 2.4.5.4'-tetrachlorodiphenylsulfide are very active compounds.

While we have described our invention in connection with specific embodiments and applications, other modifications thereof will be readily apparent to those skilled in this art without departing from the spirit and scope of the invention as defined in the appended claims:

A suitable sprayable powder according to the invention is obtained by mixing and grinding 20 parts by weight of 2.4.5.4'-tetrachloro-diphenylsulphoxide or 2.4.5.4'-tetrachlorodiphenyl sulphide with 24 parts by weight of chalk, 45 parts by weight of dolomite, 3 parts by weight of fatty alcohol sulphate and 8 parts by weight of sodium lignine sulphonate preferably until a particle size between 5 and 10μ is obtained.

What is claimed is:

1. A sprayable powder, containing 20 parts by weight of 2.4.5.4'-tetrachloro-diphenyl sulphide with 24 parts by weight of chalk, 45 parts by weight of dolomite, 3 parts by weight of fatty alcohol sulphate and 8 parts by weight of sodium lignine sulphonate.

2. The powder of claim 1 in which the particle size lies between 5 and 10μ.

3. An acaricidal composition containing as an active acaricidal ingredient an acaricidally effective amount of 2.4.5.4'-tetrachlorodiphenylsulfide and an inert carrier therefor.

4. An acaricidal composition containing as active acaricidal ingredients an acaricidal effective amount of a mixture of 2,4,5,4'-tetrachlorodiphenyl sulfide and O,O-dimethyl-S-(1,2 dicarboxyethyl) dithiophosphate.

5. An acaricidal composition containing as active acaricidal ingredients an acaricidal effective amount of a mixture of 2,4,5,4'-tetrachlorodiphenyl sulfide and 2,4,5, 4'-tetrachlorodiphenyl sulfone.

6. A method of destroying mites particularly in their developmental stages comprising contacting said mites with an acaricidally effective amount of 2.4.5.4'-tetrachlorodiphenylsulfide.

(References on following page)

References Cited in the file of this patent

UNITED STATES PATENTS

| | | |
|---|---|---|
| 2,102,200 | Dougherty | Dec. 14, 1937 |
| 2,572,898 | Woodward | Oct. 30, 1951 |
| 2,623,838 | Bender | Dec. 30, 1952 |
| 2,645,592 | Campbell | July 14, 1953 |
| 2,770,568 | Greenwood | Nov. 13, 1956 |
| 2,812,281 | Meltzer | Nov. 5, 1957 |
| 2,909,457 | Birum | Oct. 20, 1959 |

FOREIGN PATENTS

| | | |
|---|---|---|
| 255,886 | Switzerland | July 31, 1948 |

OTHER REFERENCES

King: U.S. Dept. Agr., Agriculture Handbook No. 69, May 1954, pages 219, 319 and 320.

Frear: A Catalogue of Insecticides and Fungicides, Chronica Botanica Comp., 1948, vol. I, page 58.